(12) United States Patent
Masuda

(10) Patent No.: US 7,385,640 B2
(45) Date of Patent: Jun. 10, 2008

(54) CAMERA SYSTEM, LENS APPARATUS AND CAMERA

(75) Inventor: Kazunori Masuda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 10/995,319

(22) Filed: Nov. 24, 2004

(65) Prior Publication Data

US 2005/0128339 A1 Jun. 16, 2005

(30) Foreign Application Priority Data

Dec. 11, 2003 (JP) .............................. 2003-413909

(51) Int. Cl.
*G03B 13/00* (2006.01)
*H04N 5/232* (2006.01)
*H04N 5/76* (2006.01)

(52) U.S. Cl. ................. 348/347; 348/345; 348/231.99; 348/349

(58) Field of Classification Search ................ 348/349, 348/347; 359/363
See application file for complete search history.

(56) References Cited

U.S. PATENT DOCUMENTS

| 4,492,448 A | * | 1/1985 | Ishikawa et al. ............ 396/135 |
| 5,036,399 A | * | 7/1991 | Mabuchi ..................... 348/351 |
| 5,038,163 A | * | 8/1991 | Hirasawa ..................... 396/81 |
| 5,130,732 A | * | 7/1992 | Furutsu ....................... 396/89 |
| 5,157,431 A | * | 10/1992 | Mabuchi et al. ............. 396/80 |
| 5,877,811 A | * | 3/1999 | Iijima et al. ................ 348/375 |
| 6,208,811 B1 | * | 3/2001 | Tanaka ........................ 396/91 |
| 2002/0109784 A1 | * | 8/2002 | Suda et al. ................. 348/345 |

FOREIGN PATENT DOCUMENTS

JP 4-10051 B2 2/1992
JP 5-196863 8/1993

* cited by examiner

*Primary Examiner*—David Ometz
*Assistant Examiner*—Wanda M Negron
(74) *Attorney, Agent, or Firm*—Fitzpatrick, Cella, Harper & Scinto

(57) ABSTRACT

A camera system is disclosed, which can obtain an accurate target driving amount when the target driving amount of a focusing lens is calculated while the focusing lens is driven. The camera system has a camera and a lens apparatus which has an image taking optical system including a focusing lens and is mounted on the camera. The camera has a photoelectric conversion element which photoelectrically converts an optical image, a focus information producing section which produces focus information based on the output of the photoelectric conversion element, and a communication unit which transmits timing information of the photoelectric conversion and the focus information to the lens apparatus. The lens apparatus has a memory which stores an optical information changing according to the position of the focusing lens, and a controller which controls the driving of the focusing lens.

11 Claims, 13 Drawing Sheets

FIG.3

| COMMAND (FIRST BYTE) | | SECOND BYTE |
|---|---|---|
| 00000000B | NON OPERATION | *** |
| 00000010B | INFINITY DIRECTION, SEARCH COMMAND | *** |
| 00000011B | CLOSEST DIRECTION, SEARCH COMMAND | *** |
| 00000100B | MOTOR DRIVING STOP COMMAND | *** |
| 00000101B | DEFOCUS AMOUNT RECEIVING COMMAND | DEFOCUS AMOUNT |
| 00000110B | FOCUS DRIVING SPEED RECEIVING COMMAND | FOCUS DRIVING SPEED |
| 00000111B | STATUS TRANSMITTING COMMAND | LENS OPERATION STATE |
| · | · | · |
| · | · | · |
| · | · | · |

LENS OPERATION STATE DATA

Bit7······ FOCUS DRIVING MOTOR IS BEING DRIVEN
Bit6······ FOCUS DETECTION CANNOT BE PERFORMED
Bit5······ don't care
Bit4······ don't care
Bit3······ don't care
Bit2······ don't care
Bit1······ don't care
Bit0······ don't care

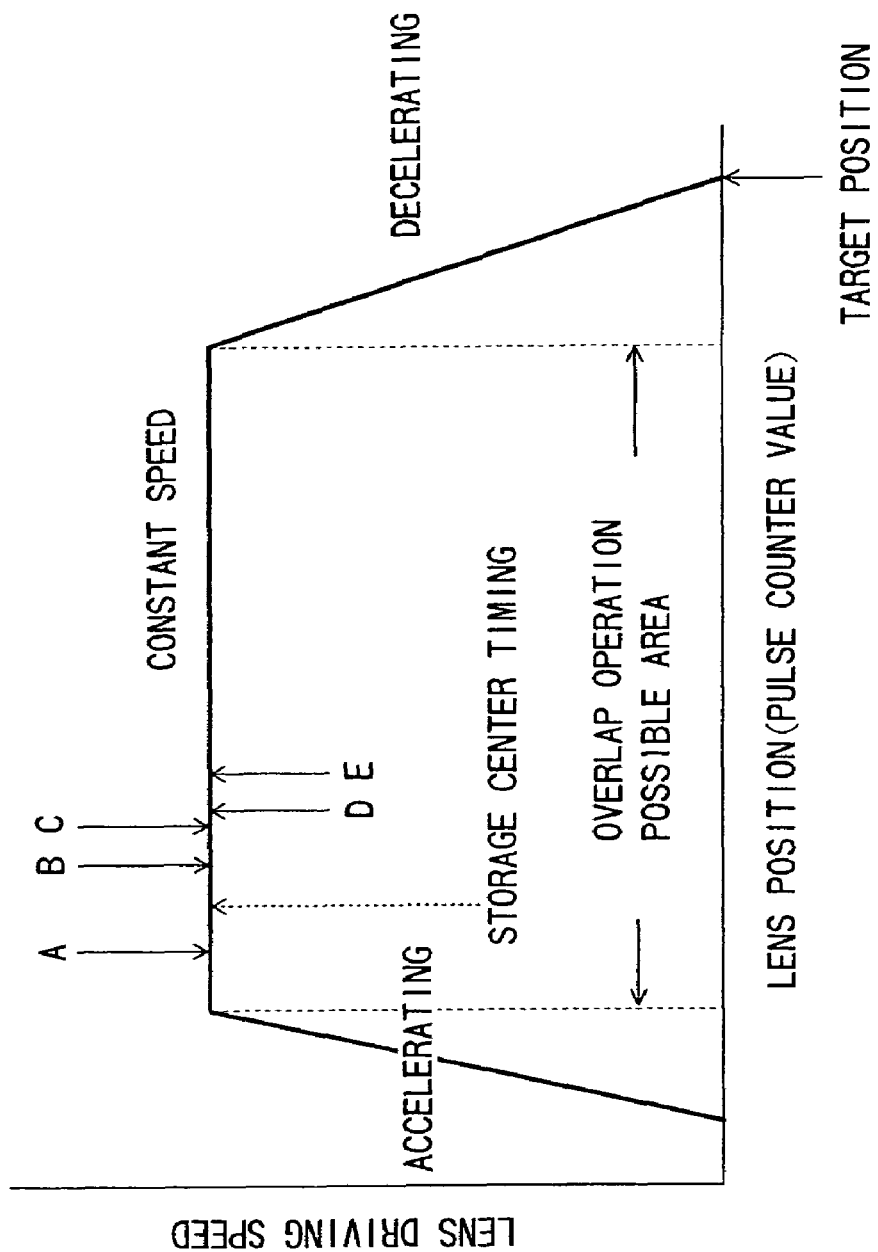

CAMERA SYSTEM, LENS APPARATUS AND CAMERA

BACKGROUND OF THE INVENTION

1. Field of the Invention

The present invention relates to a camera system for calculating a target driving amount by using the focus information of an image-taking optical system while a focusing lens is driven.

2. Description of Related Art

A TTL (through the lens) type camera for performing focusing of the image-taking optical method by using a phase difference detection system is conventionally known, wherein the focus detection operation is repeatedly performed while the focusing lens is driven so as to shorten the time to be required for focusing (re-focus detection operation during driving, hereinafter, referred to as "overlap operation").

An automatic focus controller is disclosed in Japanese Patent Publication No. H04 (1992)-10051, which performs the focus detection repeatedly while stopping and moving an image taking lens, and moves the image taking lens to an in-focus position while correcting the driving amount of the image taking lens.

Herein, it will be considered that the overlap operation described above is applied to the following camera system. This camera system captures an optical image formed by the image-taking optical system by using an image sensor provided in a camera body. In addition, the camera system obtains a defocus amount based on the signal showing the amount of detected light from the image sensor, and transmits the defocus amount to the side of an interchangeable lens. The interchangeable lens calculates the driving amount of the focusing lens based on the received defocus amount, and moves the focusing lens to a target position (in-focus position).

For example, Japanese Patent Laid-Open No. H05(1993)-196863 discloses a technique wherein the driving of the focusing lens is controlled by transmitting the defocus amount from the side of the camera body to the side of the interchangeable lens, and converting the defocus amount into the lens driving amount on the side of the interchangeable lens.

Herein, the calculated defocus amount can be converted into the driving amount of the focusing lens at the side of the camera body, and the driving amount can be transmitted to the side of the interchangeable lens. The focusing lens can be driven based on the lens driving amount received at the side of the interchangeable lens. However, in this case, it is necessary to acquire various kinds of optical data (sensitivity coefficient or the like corresponding to a focal length and lens position) of the interchangeable lens by communications, which is required when the camera body converts the defocus amount into the lens driving amount. Therefore, the camera system for transmitting the defocus amount to the side of the interchangeable lens has the advantages for which the number of communications (transmitting and receiving data) can be remarkably reduced compared with the case that the lens driving amount is transmitted to the side of the interchangeable lens, and the communications load can be reduced.

Herein, in the camera system for transmitting the defocus amount to the interchangeable lens, the focusing lens is moved from the time when detecting the amount of light necessary to calculate the defocus amount to the time when calculating the defocus amount and transmitting the defocus amount to the interchangeable lens while the overlap operation is performed, that is, in the time obtained by adding the charge storage time with respect to the object light, the calculation time and the communications time, and even during the time before converting the defocus amount received at the side of the interchangeable lens into the lens driving amount.

The relationship thereof will be described with reference to FIG. 11. FIG. 11 shows one example of the relationship between the lens driving speed and the lens position (pulse count value) from the start of the driving of the focusing lens until the attainment of the target position. Though timings shown by A to E in FIG. 11 show the timings of the operations to be described below schematically, these timings do not necessarily coincide with those in FIG. 11.

In the driving of the focusing lens, the focusing lens is firstly accelerated immediately after the start of the driving, and the lens driving speed is increased up to a constant speed. The deceleration is started when the lens position is set in a predetermined position after the lens driving speed is set to a constant speed, and the focusing lens is stopped at a target position. Herein, the overlap operation is performed only at the time at which the lens driving speed is set to a constant speed. The reason is that the overlap operation causes errors in the focus detection while the focusing lens is accelerated or is decelerated.

The charge storage operation is started in the image sensor of the side of the camera body for calculating the defocus amount when the overlap operation is performed (timing A in FIG. 11), and the charge storage operation is ended after passage of a predetermined time (timing B in FIG. 11). Herein, a storage center timing means the intermediate between the timing at which the charge storage is started and the timing at which the charge storage is ended.

The defocus amount is then calculated based on the light amount signal (accumulated charge) readout from the image sensor (timing C in FIG. 11), and data concerning the defocus amount is transmitted to the side of the interchangeable lens. The interchangeable lens receives the data concerning the defocus amount transmitted from the camera body (timing D in FIG. 11), converts the defocus amount into the lens driving amount, and starts the driving of the focusing lens (timing E in FIG. 11).

As shown in FIG. 11, the focusing lens is moved between the storage center timing and the timing E at which the lens drive is started. Therefore, various kinds of optical data (sensitivity coefficient or the like corresponding to the focal length and lens position) of the lens used for converting the defocus amount into the lens driving amount may be changed between the storage center timing and the timing E. The lens driving amount may not be accurately calculated when various kinds of optical data are acquired after the defocus amount is received.

When the focusing lens is driven by the lens driving amount calculated based on the optical data which does not correspond to the present position of the focusing lens, the focusing lens exceeds the in-focus position by only the extent that the focusing lens is moved. In this case, it is necessary to correct the lens driving amount appropriately for stopping the focusing lens at the in-focus position.

SUMMARY OF THE INVENTION

According to one aspect of the present invention, a camera system of the present invention comprises a camera and a lens apparatus which has an image taking optical system including a focusing lens and is mounted on the camera. The camera has a photoelectric conversion element which photoelectrically converts an optical image formed by the image taking optical system, a focus information producing section which produces focus information of the image taking optical system based on the output of the photoelectric conversion element, and a communication unit which transmits timing information of the photoelectric conversion by the photoelectric conversion element and the focus information to the lens apparatus. The lens apparatus has a detector which detects a position of the focusing lens, a memory which stores an optical information of the image taking optical system changing according to the position of the focusing lens, and a controller which controls the driving of the focusing lens. Wherein the controller calculates a target driving amount of the focusing lens by using the focus information and the optical information corresponding to the position of the focusing lens at the time of the photoelectric conversion during the driving of the focusing lens.

According to one aspect of the present invention, a lens apparatus of the present invention is mounted on a camera. The lens apparatus comprises an image taking optical system including a focusing lens, a detector which detects a position of the focusing lens, a memory which stores an optical information of the image taking optical system changing according to the position of the focusing lens; and a controller which controls the driving of the focusing lens. wherein the camera produces focus information of the image taking optical system by photoelectrically converting an optical image formed by the image taking optical system, and transmits timing information of the photoelectric conversion and the focus information to the lens apparatus. The controller calculates a target driving amount of the focusing lens by using the focus information and the optical information corresponding to the position of the focusing lens at the time of the photoelectric conversion during the driving of the focusing lens.

According to one aspect of the present invention, a camera on which the lens apparatus described above is mounted. The camera comprises a photoelectric conversion element which photoelectrically converts an optical image formed by an image taking optical system in the lens apparatus; a focus information producing section which produces focus information of the image taking optical system based on the output of the photoelectric conversion element; and a communication unit which transmits timing information of the photoelectric conversion by the photoelectric conversion element and the focus information to the lens apparatus.

The characteristics of the camera system, the lens apparatus and the camera of the present invention will become apparent by referring to the description of the following particular embodiments and the drawings.

BRIEF DESCRIPTION OF THE DRAWINGS

FIG. 3 is a table showing a communications command example between an interchangeable lens and a camera in Embodiment 1;

FIG. 11 shows various kinds of operation timings during overlap operation in Embodiment 1.

DETAILED DESCRIPTION OF THE PREFFERED EMBODIMENTS

Embodiment 1

Hereinafter, a camera system of Embodiment 1 according to the present invention will be described. This camera system is composed of a camera and an interchangeable lens attachably and detachably mounted on the camera.

Figure 1:
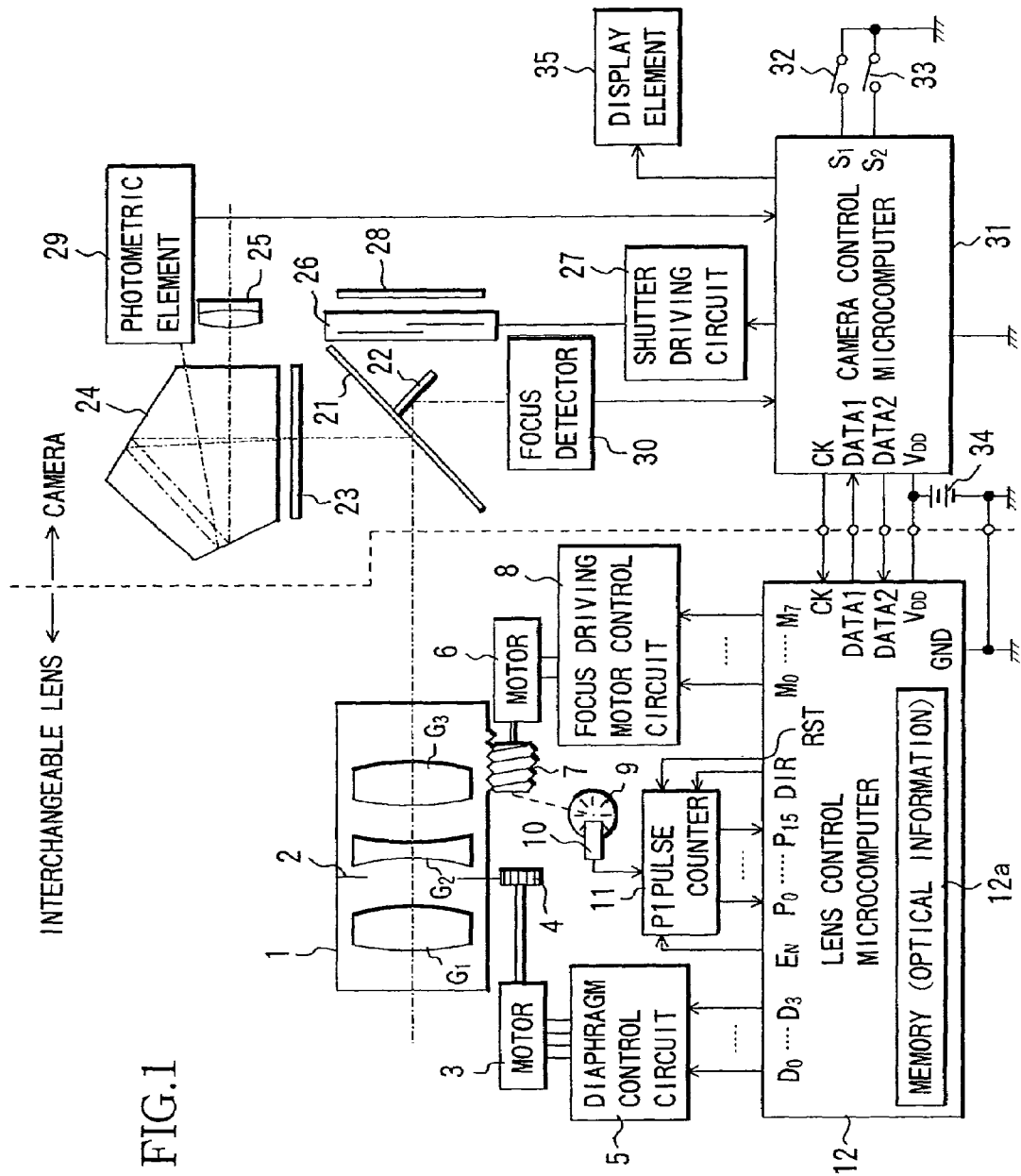
FIG. 1 is a block diagram showing the configuration of a camera system of Embodiment 1 according to the present invention.

FIG. 1 shows the structure of a camera system according to the present embodiment. In FIG. 1, Reference Numeral 1 denotes a lens barrel holding image taking lenses G1 to G3, and Reference Numeral 2 denotes a diaphragm adjusting the amount of light entering an image plane by changing the area of a light passing aperture. Reference Numeral 3 denotes a diaphragm driving motor as a driving source for the diaphragm 2, and Reference Numeral 4 denotes a pinion gear attached to the output shaft of the diaphragm driving motor 3.

Reference Numeral 5 denotes a diaphragm control circuit controlling the driving of the diaphragm 2 (diaphragm driving motor 3) based on the output of a lens control microcomputer 12, and Reference Numeral 6 denotes a focus driving motor (driving unit) as a driving source of a focusing lens of the image taking lenses G1 to G3. Reference Numeral 7 denotes a worm gear attached to the output shaft of the focus driving motor 6, and Reference Numeral 8 denotes a focus driving motor control circuit controlling the driving of the focusing lens (focus driving motor 6) based on the output of the lens control microcomputer 12.

Reference Numeral 9 denotes a pulse plate connected to the output shaft of the focus driving motor 6, Reference Numeral 10 denotes a photo interrupter, and Reference Numeral 11 denotes a pulse counter (position detecting unit) Herein, the photo interrupter 10 outputs a signal corresponding to the rotation of the pulse plate 9 due to the driving of the focus driving motor 6, and this output signal is counted by the pulse counter 11. Reference Numeral 12 denotes a lens control microcomputer (arithmetic section) controlling the operation of the interchangeable lens, and the lens control microcomputer 12 has a memory (storage section) 12a storing optical information corresponding to the position of the focusing lens.

Reference Numeral 21 denotes a main mirror which can be moved between a position at which the main mirror is on an image-taking optical path and a position at which the main mirror is out of the image-taking optical path, and the central area thereof is composed of a half mirror. Reference Numeral 22 denotes a sub mirror provided on the rear side of the main mirror 21. The sub mirror 22 reflects object light flux (light flux for focus detection) passing the central area of the main mirror 21 being in the image-taking optical path to a focus detector 30 described below.

Reference Numeral 23 denotes a focusing screen provided at an optically conjugate position with an image plane, and the object light flux reflected by the main mirror 21 forms the image on the focusing screen 23. Reference Numeral 24 denotes a pentagonal prism changing the object image formed on the focusing screen 23 to an erected image, and Reference Numeral 25 denotes an eyepiece for observing the object image.

Reference Numeral 26 denotes a focal plane shutter (hereinafter, referred to as "shutter") limiting an incident light amount to the image plane, and Reference Numeral 27 denotes a shutter driving circuit controlling the driving of the shutter 26 based on the output from the camera control microcomputer 31. Reference Numeral 28 denotes an image pickup element such as a CCD sensor and a CMOS sensor, and the optical image formed by the image taking lenses G1 to G3 is converted into an electric signal by photoelectric conversion, and the stored charge is output. After the signal output from the image pickup element 28 is converted into an image signal by a predetermined processing (for example, color processing) in a signal processing circuit (not shown), the image signal is displayed on a display section (not shown) provided on a camera as a taken image, or the image signal is stored in a recording medium.

Reference Numeral 29 denotes a photometric element measuring the luminance of the object, and this measured result is output to the camera control microcomputer 31. Reference Numeral 30 denotes a focus detector (photoelectric conversion element) for detecting the focusing state of the image-taking optical system, and Reference Numeral 31 denotes a camera control microcomputer (focus information production section, communications section) controlling the operation in the camera. Reference Numeral 32 denotes a switch (SW1) instructing start of an image taking preparation operation (photometric operation and focusing operation or the like) to the camera control microcomputer 31 as a result of the switch 32 being brought into an ON-state, and for example, the switch 32 is brought into an ON-state by the first stroke of a release button provided in the camera. Reference Numeral 33 denotes a switch (SW2) instructing start of an image taking operation to the camera control microcomputer 31 as a result of the switch 33 being brought into an ON-state, and for example, the switch 33 is brought into an ON-state by the second stroke of the release button. Reference Numeral 34 denotes a battery which becomes the operating power supply of the camera and the interchangeable lens, and Reference Numeral 35 denotes a display element displaying information showing that the image-taking optical system is in the focused state based on the output from the camera control microcomputer 31.

Next, a terminal of the lens control microcomputer 12 will be described.

Reference Symbol CK denotes a clock input terminal for synchronizing communications between the camera control microcomputer 31 and the lens control microcomputer 12. Reference Symbol DATA1 denotes a data output terminal for transmitting the data of the interchangeable lens to the camera, and Reference Symbol DATA2 denotes a data input terminal for inputting the data or the command from the camera. Reference Symbols M0 to M7 denote control terminals for outputting 8 bit control data to the focus driving motor control circuit 8.

Herein, Reference Symbol M7 (1 bit) denotes a terminal for outputting data concerning the driving direction of the focusing lens, "0" means driving in the closest direction, and "1" means driving in the infinity direction. The reference symbols M6 to M0 (7 bit) denote terminals for outputting data showing the driving speed of the focus driving motor 6 (the driving speed of the focusing lens). When the data of M6 to M0 are "0000000", the driving of the focus driving motor 6 is stopped. The driving speed of the focus driving motor 6 is increased as the data of M6 to M0 changes from "0000001" to "1111111".

Reference Symbol RST denotes a reset output terminal for resetting the count value of a pulse counter 11, and the count value is reset at "0". Reference Symbol DIR denotes an output terminal for determining the count direction (UP/DOWN) of the pulse counter 11. "0" is set to DOWN, and "1" is set to UP. Reference Symbols P0 to P15 denote input terminals in which data is input from the pulse counter 11, and the data of 16 bit is input.

Reference Symbol EN denotes an output terminal for performing the changeover between the prohibition and permission of counting in the pulse counter 11, and "0" is set to prohibition, and "1" is set to permission. Reference Symbols D0 to D3 denote control terminals for outputting data (4 bit) for controlling the driving of the diaphragm driving motor 3. Reference Symbol VDD denotes an input terminal in which power from the battery 34 is input.

Next, the terminal of the camera control microcomputer 31 will be described.

Reference Symbol CK denotes a clock output terminal for synchronizing communications between the camera control microcomputer 31 and the lens control microcomputer 12, and Reference Symbol DATA1 denotes an input terminal in which data from the interchangeable lens is input. Reference Symbol DATA2 denotes a data output terminal for outputting command or data to the interchangeable lens from the camera, and Reference Symbol S1 denotes an input terminal of the switch 32. Reference Symbol S2 denotes an input terminal of the switch 33, and Reference Symbol VDD denotes an input terminal in which power is input from the battery 34.

Next, the data communications between the lens control microcomputer 12 and the camera control microcomputer 31 will be described with reference to FIG. 2.

Figure 2:
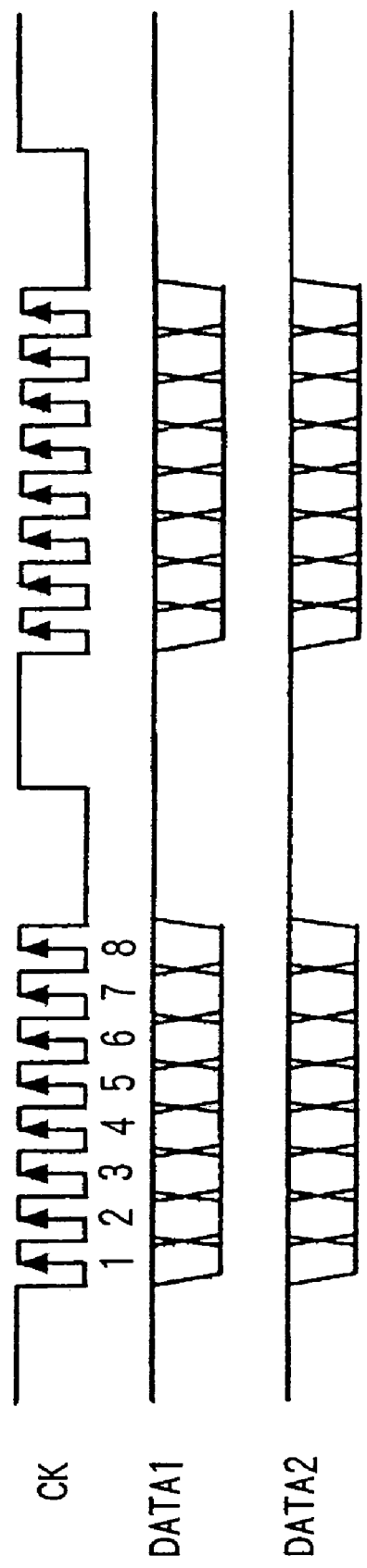
FIG. 2 is a timing chart showing communications between an interchangeable lens and a camera in Embodiment 1.

In FIG. 2, as described above, reference symbol. CK, DATA2 and DATA1 denote signal lines for serial communications between the camera and the interchangeable lens. The communications between the camera and the interchangeable lens is 8 bit, that is, eight clocks become one communications cycle. Reference Symbol DATA2 denotes a signal line for sending the command or the data to the interchangeable lens from the camera. Reference Symbol DATA1 denotes a signal line for sending the data to the camera from the interchangeable lens.

Next, the example of the communications command between the camera and the interchangeable lens will be described with reference to FIG. 3. In FIG. 3, a command system in which the side of the camera is made the operation standard is shown. "Command" of a first row in FIG. 3 shows the communications of a first byte of the DATA1 (DATA2), and the one in which the communications extend over a second byte is shown in the next row.

For example, "00000111B" means "status transmission instruction", and shows that the second byte transmits the operating state of the lens to the camera from the interchangeable lens.

Figures 4, 5:
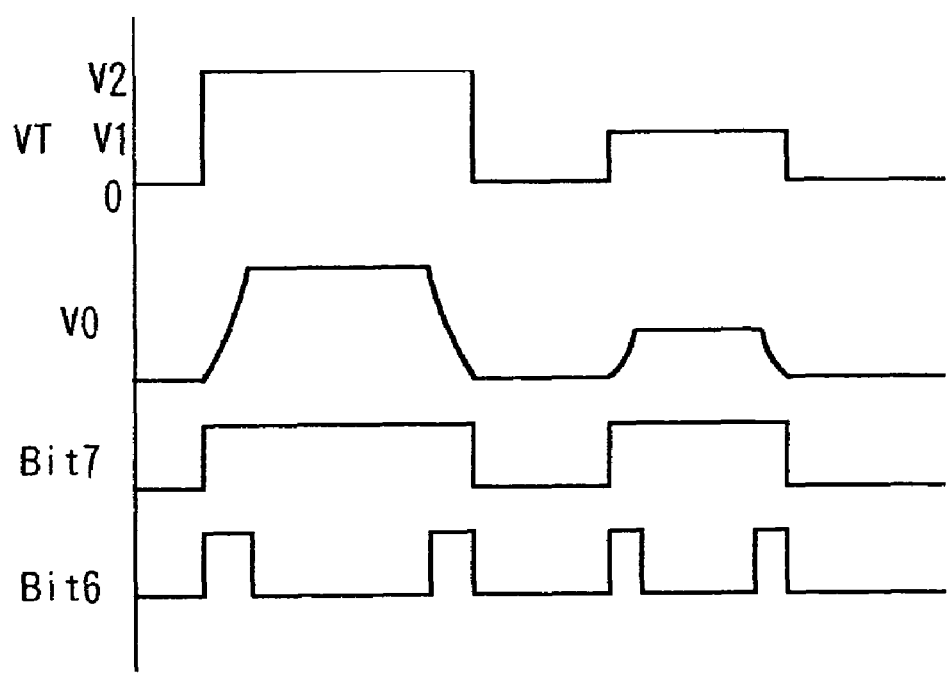
FIG. 4 is an illustration of a status signal in Embodiment 1.
FIG. 5 is an illustration of a focus driving state for focusing in Embodiment 1.

Next, "status signal" showing the operating state of the lens will be described with reference to FIG. 4. FIG. 4 shows the constitution example of each bit of the status signal. Bit 7 is set to 1 while the focus driving motor 6 is driven, and is set to 0 while the focus driving motor 6 is stopped. Bit 6 is set to 1 when the focus detection cannot be performed based on the output of the focus detector 30, that is, when the driving speed of the focus driving motor 6 is in an accelerated state and in a decelerated state. Bit 6 is set to 0 when the focus detection can be performed, that is, when the driving speed of the focus driving motor 6 is in a constant speed state and in a stopped state. The other bit is undefined (arbitrary information).

Next, the setting of the driving speed (focus driving speed) of the focusing lens will be described with reference to FIG. 5. FIG. 5 shows a method for setting the focus driving speed (timing chart). Reference Symbol VT denotes a setting value of the target driving speed, and a value (focus driving speed) directed by the communications of second byte of command "0000110B" (FIG. 3) to the lens control microcomputer 12 from the camera control microcomputer 31. Reference Symbol V0 denotes the driving speed of the focus driving motor 6. Reference Symbol Bit 7 denotes bit 7 of the status signal (FIG. 4), that is, the driving state of the focus driving motor 6. Bit 7 is set to 1 (Hi) while the focus driving motor 6 is driven, and is set to 0(Lo) while the focus driving motor 6 is stopped. Reference Symbol Bit 6 denotes bit 6 of the status signal (FIG. 4), that is, the driving speed of the focus driving motor 6. Bit 6 is set to 1(Hi) during acceleration or deceleration of the focus driving motor 6, and is set to 0(Lo) during low speed state or stopped state of the focus driving motor 6.

In FIG. 5, the target driving speed V2 directed by the camera is used as the target speed setting value of VT in a first drive for which the focus driving amount is sufficiently increased. However, a constant speed state period is made by using a slower target driving speed V1 than V2 in a second drive for which the focus driving amount is decreased, and the focus detection operation during the focus driving, that is, a so-called overlap operation can be performed. As a result, the focus detection can be continuously performed while focus driving motor 6 is driven, and the final target position of the focusing lens can be corrected.

Figure 6:
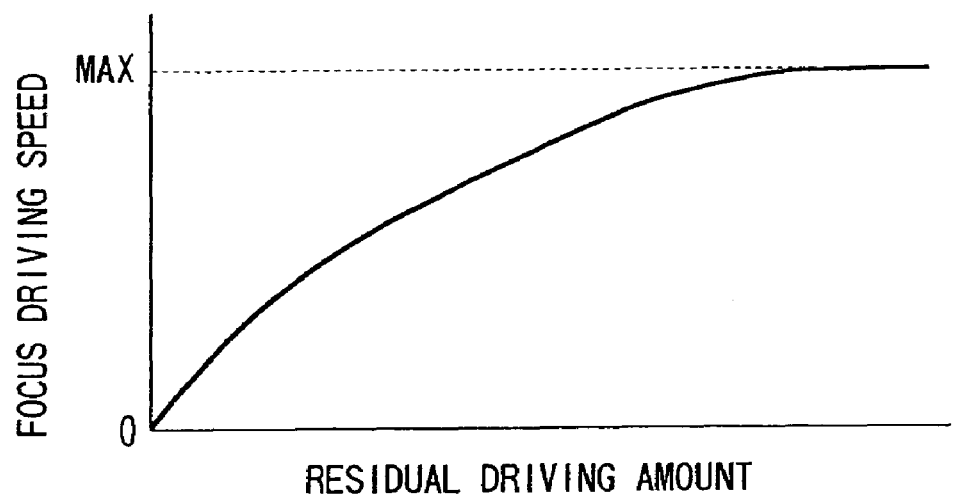
FIG. 6 shows a focus driving speed table in Embodiment 1.

FIG. 6 is a table showing the residual driving amount of the focus driving motor 6, that is, the focus driving speed with regard to the residual driving amount of the focus driving motor 6 for driving the focusing lens from the present position to the target position. This table data is stored in a ROM (not shown) of the lens control microcomputer 12, and is used for controlling the speed of the focus driving motor 6.

Figure 7:
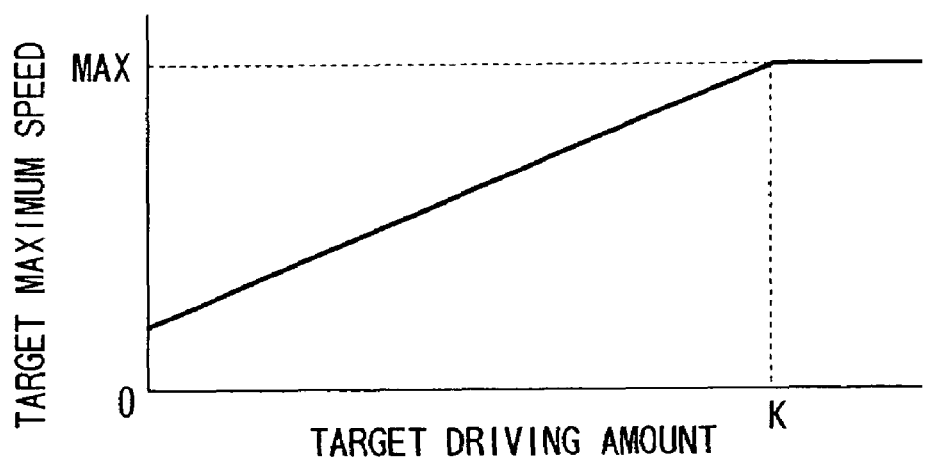
FIG. 7 shows a target maximum speed table in Embodiment 1.

FIG. 7 is a table showing the target driving amount, that is, a target maximum speed of the focus driving motor 6 with regard to the driving amount of the focus driving motor 6 for moving the focusing lens to the target position. When the target driving amount exceeds a predetermined value (shown by K in FIG. 7), the target maximum speed is set so as to be limited, and the table data is. also stored in the ROM (not shown) of the lens control microcomputer 12. The target maximum speed can also be obtained from the target driving amount without storing the target maximum speed in the ROM as the table data shown in FIG. 7.

Figure 8A:
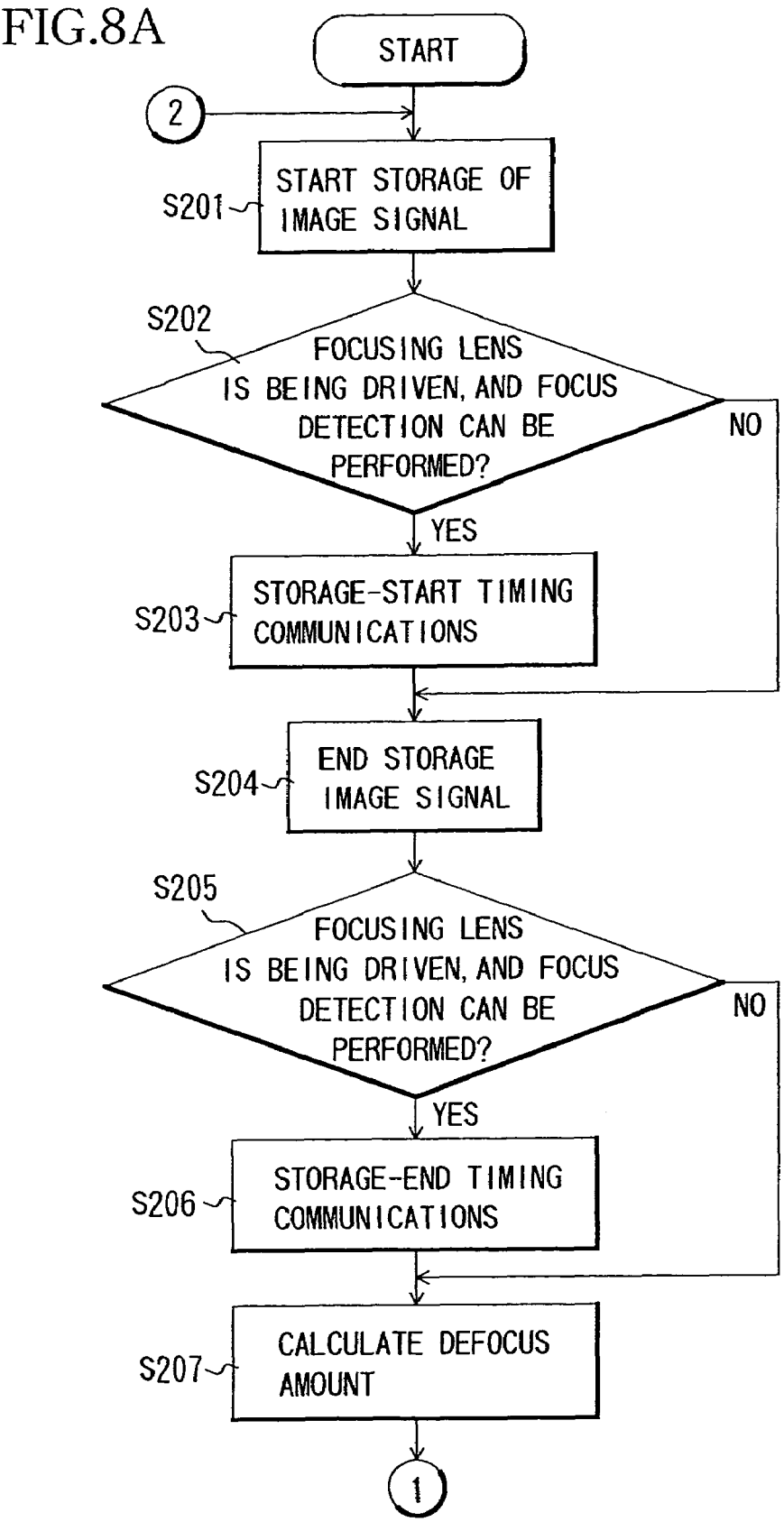
FIG. 8A and FIG. 8B are flow charts showing the operation of a camera control microcomputer in Embodiment 1.
Figure 8B:
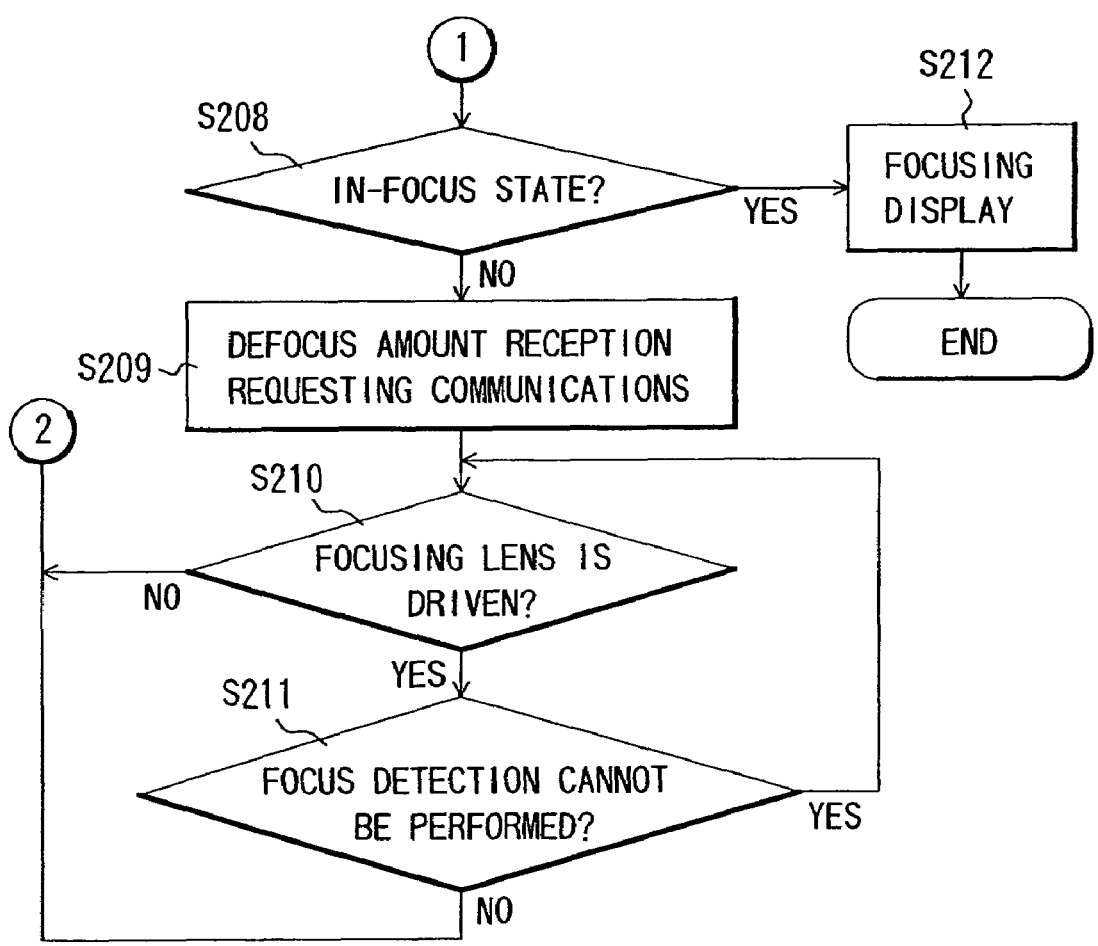

Next, the operation of the camera control microcomputer 31 when the focusing lens is driven will be described with reference to FIG. 8A and FIG. 8B.

[Step S201] When the switch 32 (SW1) is turned ON, in the camera, the focus detection of the image-taking optical system is performed by a heretofore known method. In the present embodiment, the focus detector 30 is driven to start storing of the image signal. The storage time of the image signal is greatly changed depending on the luminance of the object. That is, the storage time is changed within the range of several msec (a side on which the luminance of the object is high) to hundreds of msec (a side on which the luminance of the object is low).

[Step S202] The driving state of the focus driving motor 6 is monitored by the communications with lens control microcomputer 12. If the focusing lens is driven and the focus detection can be performed, storage of the image signal is performed by the focus detector 30 while the focus driving motor 6 is driven at a constant speed. It is determined that the overlap operation is performed, and the operation proceeds to a step S203. On the other hand, the operation proceeds to a step S204, if the focus detection cannot be performed while the focusing lens is being driven.

[Step S203] In order to transmit that storage of the image signal is started in the overlap operation to the interchangeable lens from the camera, the communications command indicating the storage-start timing of the image signal predetermined by the communications system shown in FIG. 3 is transmitted to the lens control microcomputer 12.

[Step S204] After a predetermined time has elapsed, the storage operation of the image signal in the focus detector 30 is ended.

[Step S205] The driving state of the focus driving motor 6 is monitored in the same manner as in the step S202. If the focusing lens is driven and the focus detection can be performed, it is determined that the overlap operation is performed from the fact that the storage of the image signal in the focus detector 30 has been ended while the focus driving motor 6 is being driven at a constant speed, and the operation proceeds to a step S206. On the other hand, when not, the operation proceeds to a step S207.

[Step S206] In order to transmit that the storage of the image signal is ended in the overlap operation to the interchangeable lens from the camera, the communications command, which indicates the storage end timing of the image signal and is predetermined by the communications system shown in FIG. 3, is transmitted to the lens control microcomputer 12.

[Step S207] Defocus amount (focus information) is calculated by performing a heretofore correlated calculation with regard to the storage signal obtained by the operations of the steps S201 to S204 described above.

[Step S208] It is determined that the image-taking optical system is in a focused state if the defocus amount is within a tolerable depth as a result of the defocusing calculation of the step S207, and the operation proceeds to a step S212. On the other hand, the operation proceeds to a step S209, if the image-taking optical system is not in the focused state.

[Step S209] The data concerning the defocus amount obtained in the step S207 is transmitted to the lens control microcomputer 12. First, the command ("00000101B" in FIG. 3), which requests the reception of the defocus amount and is predetermined by the communications system shown in FIG. 3, is transmitted to the lens control microcomputer 12.

[Step S210] The driving state of the focus driving motor 6 is monitored, and the operation proceeds to a step S211, if the focusing lens is being driven. The operation returns to the step S201, if the driving of the focusing lens has been ended.

[Step S211] The driving state of the focus driving motor 6 is monitored, and if the focus detection cannot be performed, the operation returns to the step S210, if the focus detection can be performed, the operation returns to the step S201 to repeat the calculation of defocus amount (overlap operation).

[Step S212] When it is determined that the image-taking optical system is in the focused state based on the defocus amount obtained in the step S207 (step S208), information indicating that the image-taking optical system is in the focused state is displayed on a display element 35, and a series of focus detection operations are ended.

As described above, the camera control microcomputer 31 performs a series of focus detection operations, and transmits the storage-start timing and end timing of the image signal during the overlap operation to the lens control microcomputer 12 through communications.

Figure 9A:
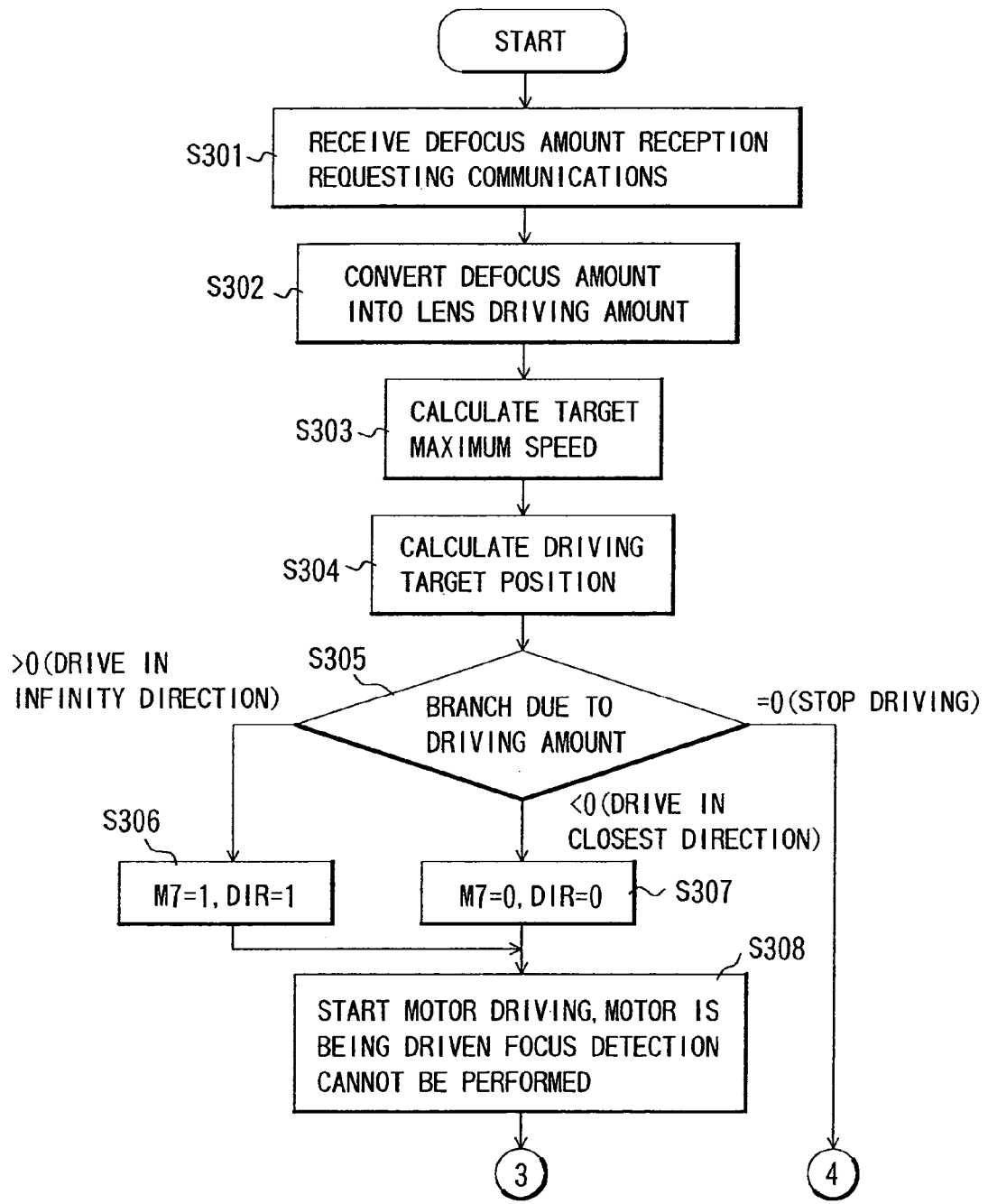
FIG. 9A and FIG. 9B are flow charts showing the operation of a lens control microcomputer in Embodiment 1.

Next, the operation of the lens control microcomputer 12 will be described with reference to FIG. 9A and FIG. 9B.

[Step S301] The lens control microcomputer 12 receives a command which is transmitted from the camera control microcomputer 31, requests the reception of the defocus amount and is predetermined by the communications system shown in FIG. 3.

[Step S302] The received defocus amount is converted into the target driving amount for driving the focusing lens to the target position. This target driving amount (the count value of a pulse counter 11) "P" is given by the following Expression (1), wherein the defocus amount is represented by "d", the moving amount of the focusing lens per one pitch of a warm gear 7 is represented by "h", and the sensitivity coefficient of the lens is represented by "S".

$$P=(-d)/(h \cdot S) \tag{1}$$

[Step s303] The target maximum speed (=VMAX) corresponding to the lens driving amount (target driving amount) calculated in the step S302 is determined from the table shown in FIG. 7 which is stored in the ROM of the lens control microcomputer 12.

[Step S304] The present count value of the present pulse counter 11 is read, and this value (the present position of the focusing lens) is set to "PCN". Next, the target driving amount calculated in the step S302 is set to "PCC", and a driving target position "PCT" is calculated by the following Expression (2).

$$PCT=PCN+PCC \tag{2}$$

[Step s305] When the driving amount of the focusing lens directed by the camera is the driving in the positive direction, that is, in the infinity direction, the operation proceeds to a step S306. When the driving of the focusing lens is the driving in the negative direction, that is, in the closest direction, the operation proceeds to a step S307. When the driving amount is 0, that is, the driving of the focusing lens is stopped, the focus driving motor 6 is not driven, and the operation proceeds to a step S321.

[Step S306] In the case of the driving in the infinity direction, in order to drive the focus driving motor 6 such that the focusing lens moves in the infinity direction, the terminal M7 is set to 1. The count direction of the pulse counter 11 is set to UP by setting the terminal DIR to 1.

[Step S307] In the case of the driving in the closest direction, in order to drive the focus driving motor 6 such that the focusing lens moves in the closest direction, the terminal M7 is set to 0. The count direction of the pulse counter 11 is set to DOWN by setting the terminal DIR to 0.

[Step S308] The data of M6 to M0 are set to a lowest speed (0000001), and the driving of the focus driving motor 6 is started. The information showing that the focus driving motor 6 is driven and the focus detection cannot be performed is transmitted to the camera control microcomputer 31 by setting bit 7 of the status signal (FIG. 4) to 1 and setting bit 6 to 1.

[Step S309] A focus driving speed (target speed VT) corresponding to a value (residual driving amount) obtained by deducting the present value "PCN" of the pulse counter 11 from the value "PCT" of the pulse counter 11 at the driving target position is calculated based on the table shown in FIG. 6 which is stored in the ROM of the lens control microcomputer 12.

[Step S310] "VMAX" calculated in the step S303 is compared with "VT" calculated in the step S309. The operation proceeds to a step S311, if "VT" is larger than "VMAX" (VT>VMAX). The operation proceeds to a step S312, if "VT" is equal to or smaller than "VMAX" (VT≦VMAX).

[Step S311] The target speed is corrected to the target maximum speed calculated in the step S303.

[Step S312] The pulse interval (present focus driving speed) is measured based on the change of the least significant bit of the pulse counter 11, and the present focus driving speed (VN) is compared with the target speed (VT). The operation proceeds to a step S313, if "VN" is larger than "VT" (VN>VT). The operation proceeds to a step S315, if "VN" is smaller than "VT" (VN<VT). The operation proceeds to a step S317, if "VN" is substantially equal to "VT" (VN≅VT).

[Step S313] When "VN" is larger than "VT", the deceleration processing is performed since the present driving speed is much faster than the target speed. That is, the control data of the motor speed output from the terminals M6 to M0 is decremented. For example, the data of M6 to M0 are changed to "0001111" from "0011111".

[Step S314] Since the deceleration processing of the focus driving motor 6 is performed in the step S313, bit 6 of the status signal (FIG. 4) is set to 1, that is, the focus detection cannot be performed.

[Step S315] When "VN" is smaller than "VT", the acceleration processing is performed since the present driving speed is much later than the target speed. That is, the control data of the motor speed output from the terminals M6 to M0 is incremented. For example, the data of M6 to M0 are changed to "0011111" from "0001111".

[Step S316] Since the acceleration processing of the focus driving motor 6 is performed in the step S315, bit 6 of the status signal (FIG. 4) is set to 1.

[Step S317] When VN is substantially equal to VT, the focus driving motor 6 is driven at a low-speed, thereby bit 6 of the status signal (FIG. 4) is reset to 0. That is, the focus detection can be performed.

[Step S318] In the area in which the focus driving motor 6 is driven at a constant speed, the overlap operation may be performed. Therefore, it is determined whether or not the communications command indicating the storage-start timing of the image signal during the overlap operation is received from the camera control microcomputer 31. Herein, when the communications command is received, the operation proceeds to a step S319, and when not, the operation proceeds to the step S320.

[Step S319] The operation proceeds to the subroutine correcting the lens driving amount which has been already calculated in the step S302 since the overlap operation is performed. The details will be described below.

[Step S320] It is determined whether or not the residual driving amount (PCT−PCN) becomes 0, and when the residual driving amount exists, the operation returns to the step S309. When the residual driving amount becomes 0, the operation proceeds to the step S321.

[Step S321] The control terminals M6 to M0 are set to "0000000" to stop the driving of the focus driving motor 6.

[Step S322] Bit 7 of the status signal (FIG. 4) is reset to 0.

[Step S323] Bit 6 of the status signal (FIG. 4) is reset to 0, and the focusing operation is ended.

Figure 10:
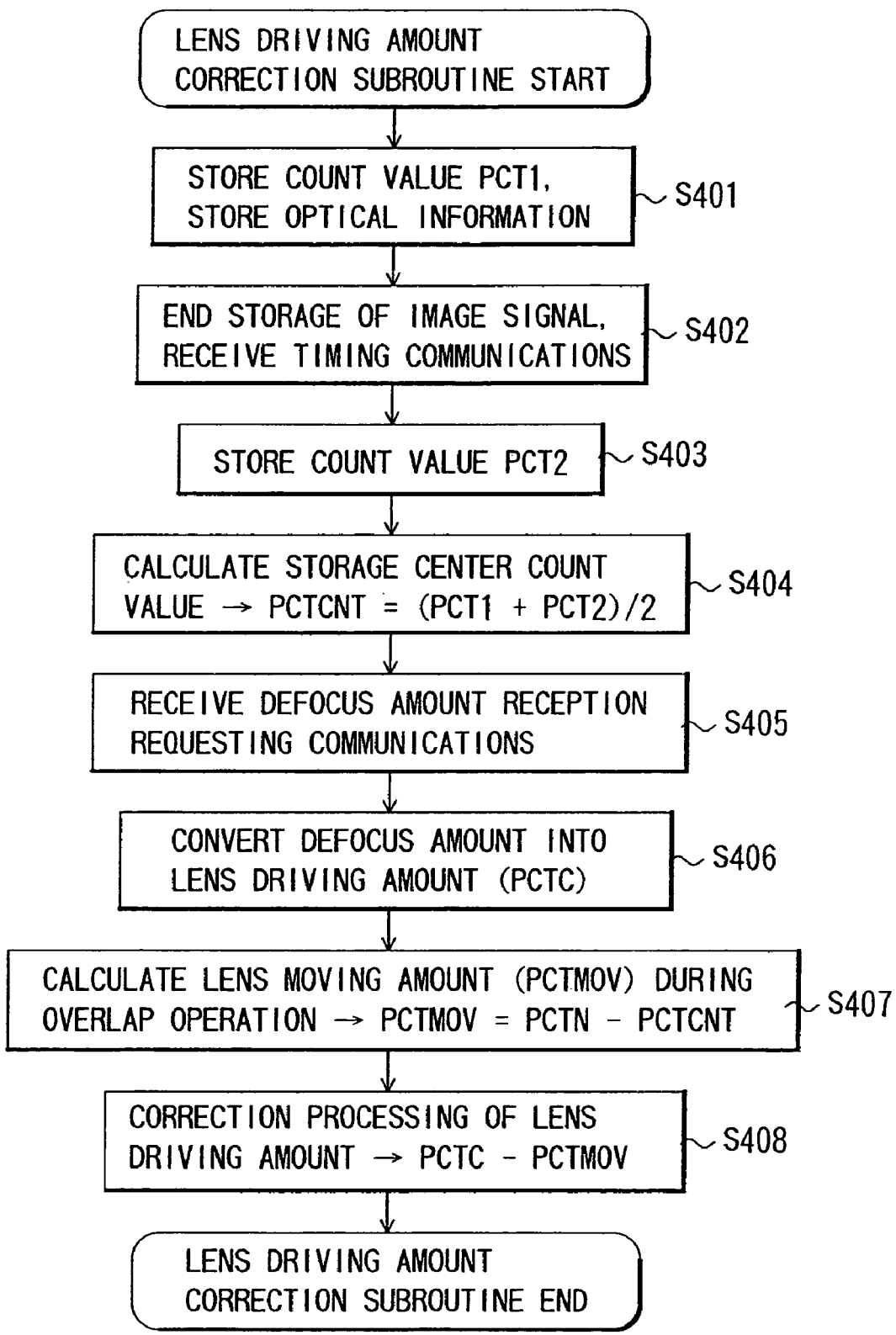
FIG. 10 is a flow chart showing the operation of a subroutine of a lens control microcomputer in Embodiment 1.

Herein, the details of the subroutine for correcting the lens driving amount in the step S319 described above will be described by using a flow chart of FIG. 10.

[Step S401] In the state for correcting the lens driving amount, the communications command indicating the storage-start timing of the image signal during the overlap operation is received (step S318). Therefore, after the communications command is received, the count value "PCT1" (the lens position corresponding to the timing A in FIG. 11) of the pulse counter 11 detecting the position of the focusing lens is stored in an internal memory (not shown). Simultaneously, the optical information changing according to the position of the focusing lens, for example, the sensitivity coefficient used when calculating the lens driving amount from the defocus amount is stored in the internal memory.

Herein, the optical information stored in the internal memory is used in a processing which is performed afterwards and calculates the lens driving amount from the defocus amount.

When the communications command indicating the storage-start timing of the image signal is received in the present embodiment, the optical information changing according to the position of the focusing lens is stored. However, the optical information may be stored at the time (timing B in FIG. 11) of receiving the communications command indicating the storage end timing of the image signal. The optical information may be stored at an arbitrary time between a time of receiving the communications command of the storage-start timing of the image signal and a time of receiving the communications command of the storage end timing of the image signal. Thus, the same effect as the present embodiment can be achieved.

[Step S402] The storage operation of the image signal at the side of the camera is ended after elapse of a predetermined time, and the communications command indicating the storage end timing of the image signal is received from the camera control microcomputer 31.

[Step S403] After the communications command is received in the step S402, the count value "PCT2" (the lens position corresponding to the timing B in FIG. 11) of the pulse counter 11 detecting the position of the focusing lens is stored.

[Step S404] During the overlap operation, the focus driving motor 6 is driven at a constant speed. Therefore, the count value "PCTCNT" (the lens position corresponding to the storage center timing of FIG. 11) of the storage center timing (see FIG. 11) is calculated from the following Expression (3) by "PCT1" and "PCT2" stored in the step S401 and the step S403.

$$PCTCNT=(PCT1+PCT2)/2 \quad (3)$$

[Step S405] A command, which requests the reception of the defocus amount and is predetermined by the communications system shown in FIG. 3, is received from the camera control microcomputer 31. At this time, data concerning the defocus amount is also received in the second byte.

[Step S406] The defocus amount received in the step S405 is converted into the lens driving amount (count value). This lens driving amount "PCTC" is given by the following Expression (4), wherein the defocus amount is represented by "d", the moving amount of a focusing lens per one pitch is represented by "h", and the sensitivity coefficient is represented by "S". Herein, the value stored in the internal memory in the step S401 is used for the sensitivity coefficient S.

$$PCTC=(-d)/(h \cdot S) \quad (4)$$

[Step S107] The lens moving amount "PCTMOV" due to the moving of the focusing lens from the overlap operation start (substantially equal to the storage center timing) until the present point of time is calculated by the following Expression (5).

$$PCTMOV=PCTN-PCTCNT \quad (5)$$

Herein, "PCTN" represents a present pulse count value, and "PCTCNT" represents a value calculated in the step S404. As a result, a value for correcting the moving amount of the focusing lens is calculated.

[Step S408] A correct lens driving amount is calculated by the following Expression (6) based on the lens driving amount "PCTC" calculated in the step S406 and the moving amount of the focusing lens "PCTMOV" calculated in the step S407.

$$\text{Correct lens driving amount}=PCTC-PCTMOV \quad (6)$$

Figure 9B:
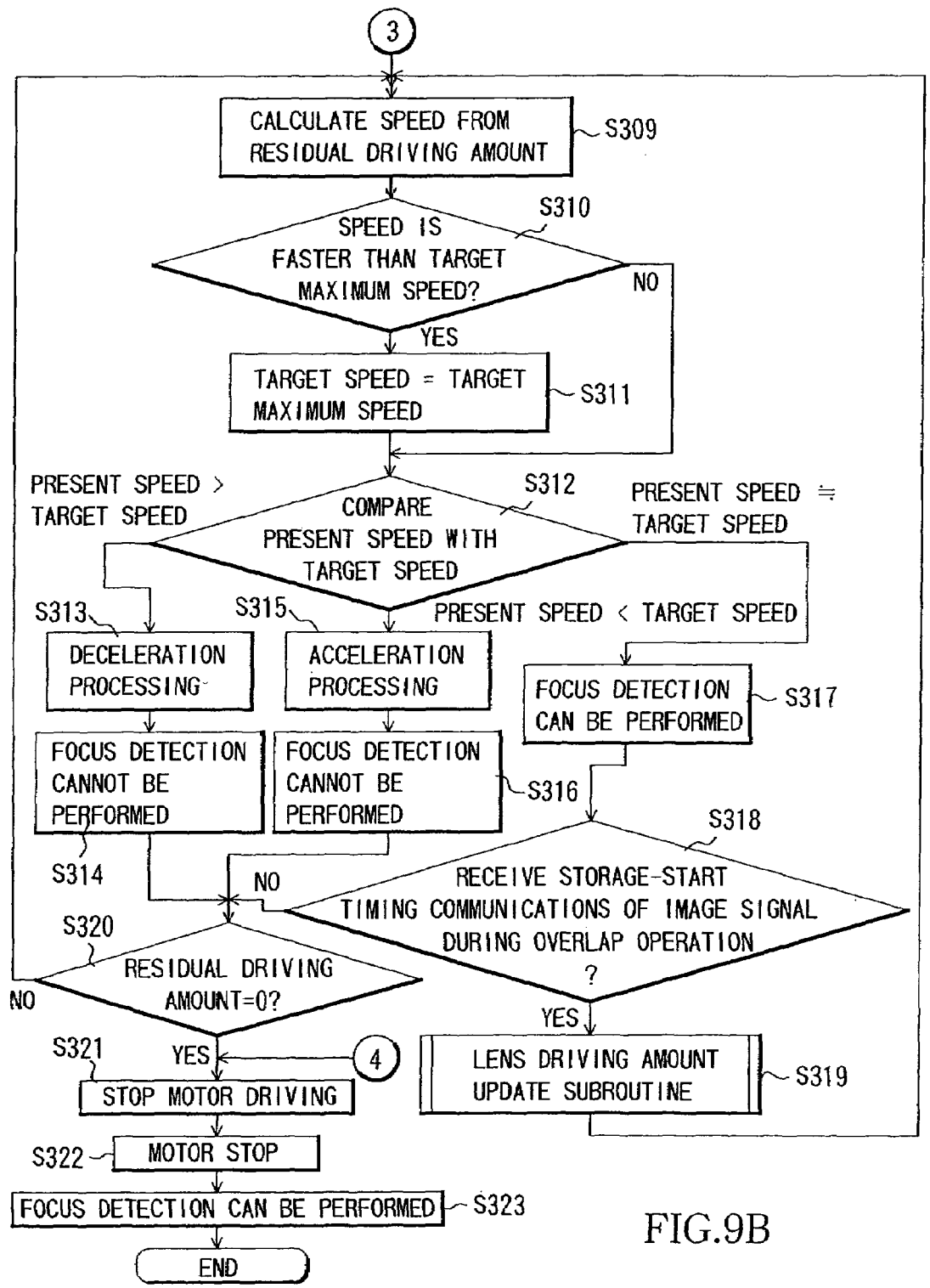

The operation returns to the step S309 in FIG. 9B for driving the focusing lens by the lens driving amount calculated by the above Expression (6).

As described above, the lens control microcomputer 12 receives the communications command indicating the timing of the storage-start and storage-end of the image signal transmitted from the camera control microcomputer 31 during the overlap operation, and the positional information of the focusing lens and the optical information corresponding to the position of the focusing lens is stored in the internal memory (not shown) according to the timing. The lens driving amount is then calculated from the defocus amount by using the stored value, and the driving correction amount of the focusing lens during the overlap operation is calculated. The calculated lens driving amount is corrected, and the driving of the focusing lens is controlled. As a result, the overlap operation can be accurately performed.

Embodiment 2

Next, a camera system of Embodiment 2 according to the present invention will be described. In Embodiment 1, the storage operation of various kinds of optical information (the focal length of the image-taking optical system and sensitivity coefficient corresponding to the position of the focusing lens) of the lens used for converting into the lens driving amount from the defocus amount received by the interchangeable lens to the internal memory is performed when the communications command indicating the timing of the storage-start of the image signal in the focus detector is received.

However, the more accurately lens driving amount can be calculated by using the optical information at the lens position corresponding to the storage center timing. Therefore, in the present embodiment, when the communications command of the storage-start timing of the image signal is received, the optical information (the focal length of the image-taking optical system and sensitivity coefficient corresponding to the position of the focusing lens) of the interchangeable lens used for calculating the lens driving amount from the defocus amount is stored. Whether or not the optical information is changed is then monitored until the communications command of the storage end timing of the image signal is received. The pulse counter value and the optical information when the optical information is changed are stored, and the optical information according to the lens position of the storage center timing of the image signal is more accurately specified.

Since the difference between the operation of the present embodiment and the operation of Embodiment 1 is only the subroutine for correcting the lens driving amount in the step S319 in FIG. 9B, other description is omitted. That is, a main routine for performing the focusing by driving the focusing lens is the same as the operation (FIG. 9A and FIG. 9B) described in Embodiment 1. The configuration of the camera system in the present embodiment is identical to that in Embodiment 1.

Figure 12A:
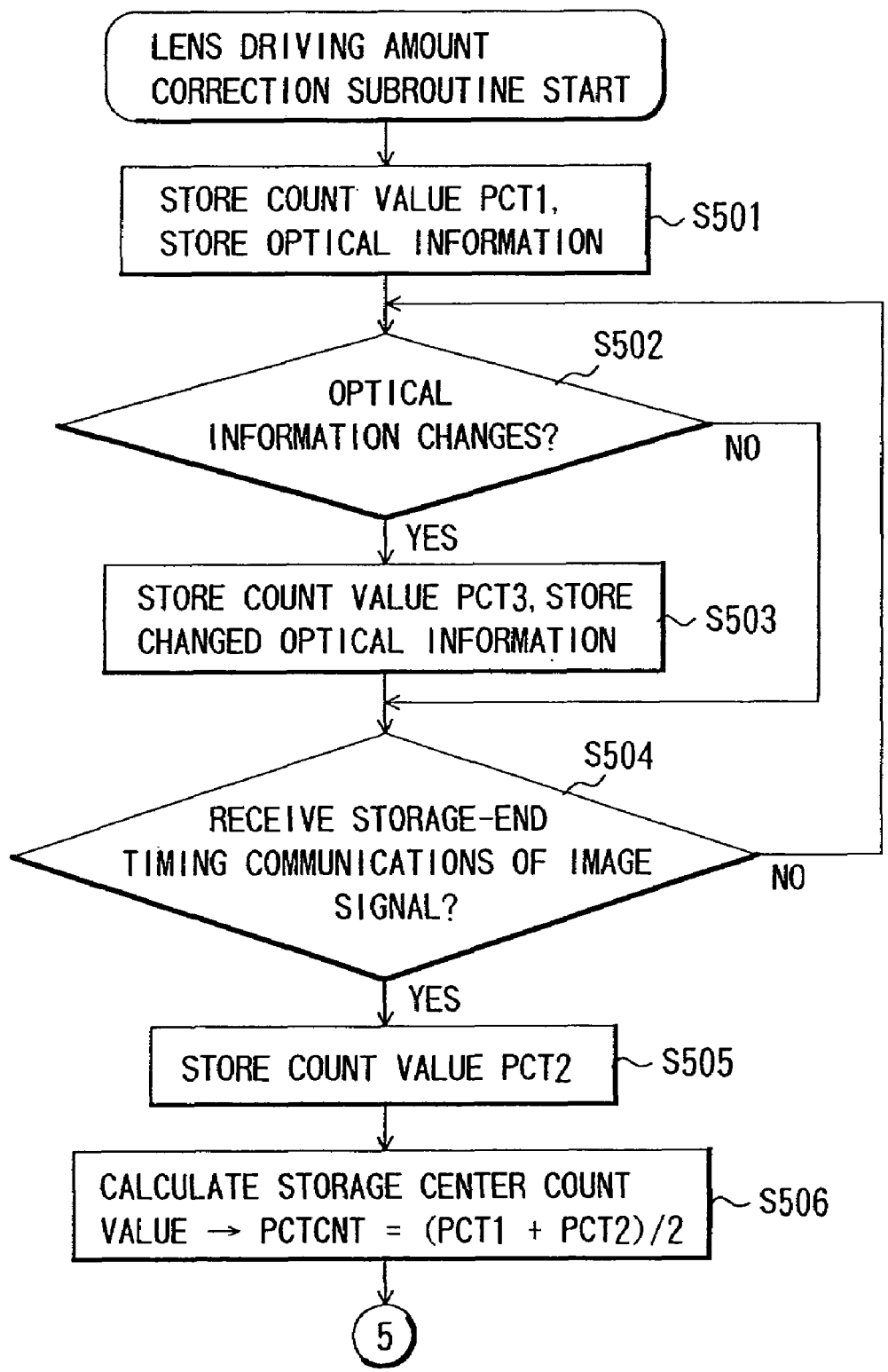
FIG. 12A and FIG. 12B are flow charts showing the operation of a subroutine of a lens control microcomputer in Embodiment 2 according to the present invention.
Figure 12B:
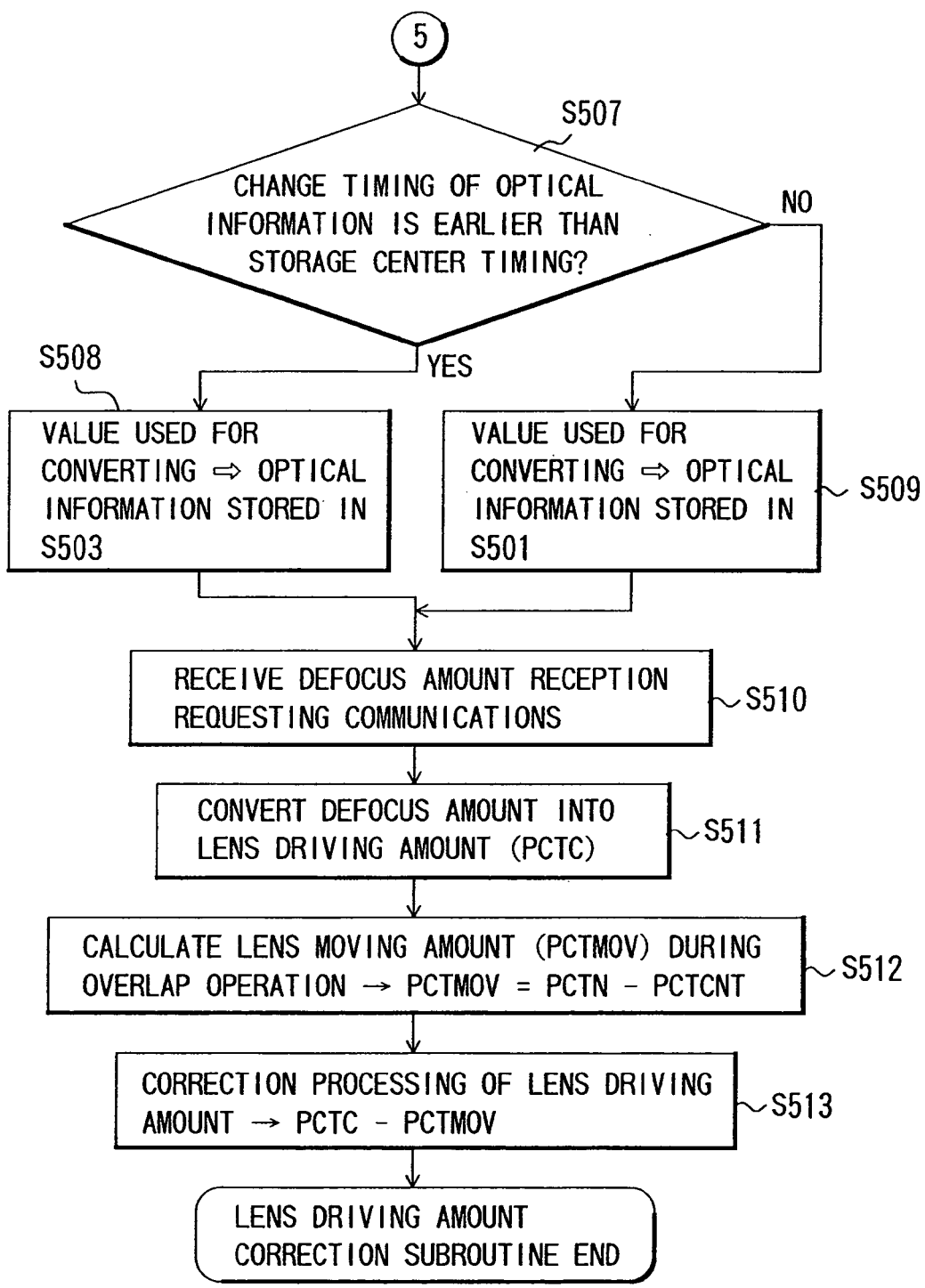

Hereinafter, a detailed operation of the subroutine for correcting the lens driving amount in the present embodiment will be described by using flow charts of FIG. 12A and FIG. 12B.

[Step S501] In this step, the communications command indicating the storage-start timing of the image signal during the overlap operation is received. Therefore, after the communications command is received, the count value "PCT1" of the pulse counter 11 detecting the position of the focusing lens is stored in the internal memory. Simultaneously, the optical information changing according to the position of the focusing lens, for example, the sensitivity coefficient used when the lens driving amount is calculated from the defocus amount is stored in the internal memory.

[Step S502] Whether or not the optical information changing according to the position of the focusing lens, for example, the sensitivity coefficient used when the lens driving amount is calculated from the defocus amount is changed is monitored until the communications command indicating the storage end timing of the image signal is received. That is, it is determined whether or not the optical information is changed according to the lens position based on the count value of the pulse counter 11 and the optical information stored in the internal memory.

The monitoring timing of the optical information can be performed by a timer or the like at a predetermined time interval. Herein, the operation proceeds to a step S503 if the optical information is changed, and the operation proceeds to a step S504 if the optical information is not changed.

[Step S503] Since the optical information is changed, the count value "PCT3" of the pulse counter 11 at the monitoring timing of the optical information and the optical information after changing are stored in the internal memory.

[Step S504] It is determined whether or not the communications command indicating the storage end timing of the image signal is received from the camera control microcomputer 31. Herein, the operation proceeds to a step S505 if the communications command is received. If the communications command is not received, the operation returns to the step S502, and the change of the optical information is monitored continuously.

[Step S505] The count value "PCT2" of the pulse counter 11 detecting the position of the focusing lens when the communications command indicating the storage end timing of the image signal is received is stored in the internal memory.

[Step S506] Since the focus driving motor 6 is driven at a constant speed during the overlap operation, the lens position "PCTCNT" of the storage center timing is calculated from the following Expression (7) by "PCT1" and "PCT2" stored in the step S501 and the step S505.

$$PCTCNT = (PCT1 + PCT2)/2 \qquad (7)$$

[Step S507] The optical information corresponding to the lens position "PCTCNT" of the storage center timing of the optical information stored in the memory 12a is specified. The count value "PCT3" of the pulse counter 11, which is stored in the step S503 and indicates the position of the focusing lens when the optical information is changed, is compared with the lens position "PCTCNT" of the storage center timing, and it is determined whether or not the change timing of the optical information is earlier than the storage center timing. The operation proceeds to a step S508 if the change timing is earlier than the storage center timing, and the operation proceeds to a step S509 if the change timing is not earlier than the storage center timing.

[Step S508] Since the change timing of optical information is earlier than the storage center timing, the optical information changing according to the lens position and used when the defocus amount is calculated, for example, the sensitivity coefficient is set to a value stored in the step S503.

[Step S509] Since the change timing of the optical information is later than the storage center timing, the optical information changing according to the lens position and used when the defocus amount is calculated, for example, the sensitivity coefficient is set to a value first stored in the step S501.

[Step S510] A command, which requests the reception of the defocus amount and is predetermined by the communications system shown in FIG. 3, is received from the camera control microcomputer 31. At this time, data concerning the defocus amount is received in the second byte.

[Step S511] The defocus amount received in the step S510 is converted into the lens driving amount (the number of pulses). Particularly, the lens driving amount "PCTC" is given by the following Expression (8), wherein the defocus amount is represented by "d", the moving amount of a focusing lens per one pitch is represented by "h", and the sensitivity coefficient is represented by "S".

$$PCTC = (-d)/(h \cdot S) \qquad (8)$$

Herein, as the sensitivity coefficient "S", the value determined in the step S508 or the step S509 is used.

[Step S512] The moving amount "PCTMOV" of the focusing lens moved from the start of the overlap operation until the present point of time is calculated by the following Expression (9).

$$PCTMOV = PCTN - PCTCN \qquad (9)$$

Herein, "PCTN" represents a present pulse count value, and "PCTCNT" represents a value calculated in the step S506. As a result, the correction moving amount of the focusing lens is calculated.

[Step S513] A correct lens driving amount is calculated by the following Expression (10) based on the lens driving amount "PCTC" calculated in the step S511 and the lens moving amount ".PCTMOV" calculated in the step S512.

$$\text{Correct lens driving amount} = PCTC - PCTMOV \qquad (10)$$

The operation returns to the step S309 in FIG. 9B so as to drive the focusing lens by the lens driving amount calculated by the Expression (10).

As described above, the lens control microcomputer 12 receives the communications command indicating the storage-start timing and storage end timing of the image signal transmitted from the camera control microcomputer 31 during the overlap operation, and stores the positional information of the focusing lens and the optical information corresponding to the position of the focusing lens at the reception timing.

Whether or not the optical information corresponding to the position of the focusing lens is changed from the storage-start of the image signal to the storage end is monitored. When the optical information is changed, the positional information of the focusing lens and the optical information corresponding to the position of the focusing lens at the point of time are stored, and the optical information at the storage center timing is specified.

The lens driving amount is then calculated from the defocus amount based on the optical information at the storage center timing, and the lens driving correction amount during the overlap operation is calculated. The calculated lens driving amount is corrected, and the driving of the focusing lens is controlled. As a result, the overlap operation can be more accurately performed.

According to the present invention, in the case where the target driving amount of the focusing lens is calculated during the driving focusing lens, an accurate target driving amount of the focusing lens can be obtained by correcting the target driving amount while the moving amount of the focusing lens between the time of the photoelectric conversion of the optical image and the time of the calculation of the target driving amount is taken into consideration.

Herein, the intermediate position of the focusing lens from the start to the end of the photoelectric conversion is obtained, and the moving amount is calculated based on the intermediate position and the position at the time of the calculation of the target driving amount. In addition, the target driving amount is corrected based on the moving amount. Thereby, for example, the focusing lens can be prevented from exceeding the in-focus position as in the conventional manner.

The storage section storing the optical information of the image-taking optical system, which changes according to the position of the focusing lens is provided, and the target driving amount is calculated based on the optical information corresponding to the position of the focusing lens at the time of the photoelectric conversion and the focus information. Thereby, the target driving amount corresponding to the optical information changed by the position of the focusing lens can be obtained.

An accurate target driving amount can be obtained by calculating the target driving amount based on the optical information corresponding to the intermediate position of the focusing lens between the start and the end of the photoelectric conversion, and the focus information compared with the case where the target driving amount is calculated by using the optical information at the time the focus information is obtained.

While preferred embodiments have been described, it is to be understood that modification and variation of the present invention may be made without departing from the scope of the following claims.

"This application claims priority from Japanese Patent Application No. 2003-413909 filed on Dec. 11, 2003, which is hereby incorporated by reference herein."

What is claimed is:

1. A camera system comprising:
    a camera; and
    a lens apparatus which has an image taking optical system including a focusing lens and which is mounted on the camera,
    wherein the camera has (a) a photoelectric conversion element which photoelectrically converts an optical image formed by the image taking optical system, (b) a focus information producing section which produces focus information of the image taking optical system based on the output of the photoelectric conversion element, and (c) a communication unit which transmits timing information of the photoelectric conversion by the photoelectric conversion element and the focus information to the lens apparatus,
    wherein the lens apparatus has (a) a detector which detects a position of the focusing lens, (b) a memory which stores an optical information of the image taking optical system, the optical information changing according to the position of the focusing lens and corresponding to the position of the focusing lens at the time indicated in the timing information transmitted from the communication unit, and (c) a controller which controls the driving of the focusing lens, and
    wherein, during the driving of the focusing lens, the controller calculates a target driving amount of the focusing lens by using the focus information produced by the focus information producing section and the optical information stored in the memory.

2. The camera system according to claim 1, wherein the controller collects the target driving amount based on a driving amount of the focusing lens between a start time of the photoelectric conversion and a time of the calculation of the target driving amount.

3. The camera system according to claim 1, wherein the timing information is information indicating a start of the photoelectric conversion, and the controller calculates the target driving amount by using the optical information corresponding to the position of the focusing lens at the start time of the photoelectric conversion.

4. The camera system according to claim 1, wherein the timing information is information indicating a start and an end of the photoelectric conversion, and the controller determines whether or not the optical information changes due to the movement of the focusing lens between a start and an end of the photoelectric conversion, and calculates the target driving amount by using the changing optical information in a case where the optical information changes.

5. The camera system according to claim 4, wherein the controller calculates the target driving amount by using one of the optical information at the start time of the photoelectric conversion and the changing optical information based on the position of the focusing lens when the optical information changes and an intermediate position of the focusing lens between the start and the end of the photoelectric conversion.

6. A lens apparatus mounted on a camera; the lens apparatus comprising:
    an image taking optical system including a focusing lens;
    a detector which detects a position of the focusing lens;
    a memory which stores an optical information of the image taking optical system changing according to the position of the focusing lens; and
    a controller which controls the driving of the focusing lens,
    wherein the camera produces focus information of the image taking optical system by photoelectrically converting an optical image formed by the image taking optical system, and transmits timing information of the photoelectric conversion and the focus information to the lens apparatus, wherein the memory stores the optical information corresponding to the position of the focusing lens at the time indicated in the timing information transmitted from the camera, and wherein during the driving of the focusing lens, the controller calculates a target driving amount of the focusing lens by using the focus information produced by the camera and the optical information stored in the memory.

7. The lens apparatus according to claim 6, wherein the controller collects the target driving amount based on a driving amount of the focusing lens between a start time of the photoelectric conversion and a time of the calculation of the target driving amount.

8. The lens apparatus according to claim 6, wherein the camera transmits the timing information indicating a start of the photoelectric conversion, and the controller calculates the target driving amount by using the optical information corresponding to the position of the focusing lens at the start time of the photoelectric conversion.

9. The lens apparatus according to claim 6, wherein the controller determines whether or not the optical information changes due to the movement of the focusing lens between a start and an end of the photoelectric conversion, and calculates the target driving amount by using the changing optical information in a case where the optical information changes.

10. A camera on which the lens apparatus according to claim 6 is mounted, the camera comprising:

a photoelectric conversion element which photoelectrically converts an optical image formed by an image taking optical system in the lens apparatus;

a focus information producing section which produces focus information of the image taking optical system based on the output of the photoelectric conversion element; and a communication unit which transmits timing information of the photoelectric conversion by the photoelectric conversion element and the focus information to the lens apparatus.

11. The camera according to claim 10, wherein the timing information is information indicating at least one of a start and an end of the photoelectric conversion.

* * * * *

UNITED STATES PATENT AND TRADEMARK OFFICE
CERTIFICATE OF CORRECTION

PATENT NO.         : 7,385,640 B2
APPLICATION NO.    : 10/995319
DATED              : June 10, 2008
INVENTOR(S)        : Kazunori Masuda It is certified that error appears in the above-identified patent and that said Letters Patent is hereby corrected as shown below:

COLUMN 3
      Line 26, "lens." should read --lens,--.

COLUMN 4
      Line 53, "unit)" should read --unit).--.

COLUMN 6
      Line 45, "symbol." should read --symbol--.

COLUMN 7
      Line 58, "is." should read --is--.

COLUMN 9
      Line 33, "s303" should read --S303--.
      Line 45, "s305" should read --S305--.

COLUMN 12
      Line 9, "S107" should read --S407--.

COLUMN 14
      Line 47, "PCTCN" should read --PCTCNT--.
      Line 56, ".PCTMOV" should read --PCTMOV--.

UNITED STATES PATENT AND TRADEMARK OFFICE
CERTIFICATE OF CORRECTION

PATENT NO. : 7,385,640 B2
APPLICATION NO. : 10/995319
DATED : June 10, 2008
INVENTOR(S) : Kazunori Masuda It is certified that error appears in the above-identified patent and that said Letters Patent is hereby corrected as shown below:

COLUMN 16
      Line 25, "collects" should read --corrects--.
      Line 51, "camera;" should read --camera,--.

COLUMN 17
      Line 11, "collects" should read --corrects--.

Signed and Sealed this

Second Day of December, 2008

JON W. DUDAS
*Director of the United States Patent and Trademark Office*